United States Patent
Steiner et al.

(10) Patent No.: US 11,495,097 B2
(45) Date of Patent: Nov. 8, 2022

(54) RADIO FREQUENCY IDENTIFICATION IN SELF-CHECKOUT

(71) Applicant: Toshiba Global Commerce Solutions Holdings Corporation, Tokyo (JP)

(72) Inventors: David Steiner, Raleigh, NC (US); Kimberly Wood, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 10 days.

(21) Appl. No.: 16/854,597

(22) Filed: Apr. 21, 2020

(65) Prior Publication Data
US 2021/0327224 A1   Oct. 21, 2021

(51) Int. Cl.
G07G 1/00 (2006.01)
A47F 9/04 (2006.01)
B65G 15/02 (2006.01)
G06K 7/10 (2006.01)

(52) U.S. Cl.
CPC ............ *G07G 1/009* (2013.01); *A47F 9/048* (2013.01); *B65G 15/02* (2013.01); *G06K 7/10445* (2013.01); *A47F 2009/041* (2013.01)

(58) Field of Classification Search
CPC ... G07G 1/009; A47F 9/048; A47F 2009/041; B65G 15/02; G06K 7/10445
See application file for complete search history.

(56) References Cited

U.S. PATENT DOCUMENTS

| | | | |
|---|---|---|---|
| 7,218,231 B2* | 5/2007 | Higham | G06Q 10/087 340/572.1 |
| 7,395,945 B2* | 7/2008 | Godlewski | A47B 49/004 221/120 |
| 2007/0030150 A1* | 2/2007 | Mullins | G06K 7/10336 340/572.1 |
| 2010/0194538 A1* | 8/2010 | dos Reis Medeiros | G06K 7/10316 340/10.1 |
| 2017/0161707 A1* | 6/2017 | Chin | G06K 7/10009 |
| 2017/0224438 A1* | 8/2017 | Johnson | A61B 90/98 |
| 2019/0263312 A1* | 8/2019 | Cencer | B60P 3/079 |

* cited by examiner

*Primary Examiner* — Thien M Le
*Assistant Examiner* — Asifa Habib
(74) *Attorney, Agent, or Firm* — Patterson + Sheridan, LLP

(57) ABSTRACT

The present disclosure provides for radio frequency identification in self-checkout via a first product pathway; a single Radio Frequency Identifier (RFID) antenna, having a first scanning zone aligned with the first product pathway; wherein the first product pathway is configured to: position a first set of objects within the first scanning zone at a first position relative to the single RFID antenna at a first time; and position the first set of object within the first scanning zone at a second position relative to the single RFID, different than the first position, at a second time; and wherein the single RFID antenna is configured to: receive, at the first time, a first set of identifier signals associated with at least some of the first set of objects; and receive, at the second time, a second set of identifier signals associated with at least some of the first set of objects.

20 Claims, 13 Drawing Sheets

RADIO FREQUENCY IDENTIFICATION IN SELF-CHECKOUT

BACKGROUND

The present invention relates to Radio Frequency Identification (RFID) and more specifically, to the improved deployment of RFID in self-checkout kiosks.

SUMMARY

According to one embodiment of the present invention, a system is provided that comprises: a first product pathway; a single Radio Frequency Identifier (RFID) antenna, having a first scanning zone aligned with the first product pathway; wherein the first product pathway is configured to: position a first set of objects within the first scanning zone at a first position relative to the single RFID antenna at a first time; and position the first set of object within the first scanning zone at a second position relative to the single RFID, different than the first position, at a second time; and wherein the single RFID antenna is configured to: receive, at the first time, a first set of identifier signals associated with at least some of the first set of objects; and receive, at the second time, a second set of identifier signals associated with at least some of the first set of objects.

According to one embodiment of the present invention, a kiosk is provided that comprises: a single RFID antenna, configured to project and receive signals relative to a first scanning zone; and a first motor, configured to move objects along a first product pathway relative to the single RFID antenna from a first position in the first scanning zone to a second position in the first scanning zone.

According to one embodiment of the present invention, a method is provided that comprises: transmitting, via a single RFID antenna, a first energization signal; receiving, by the single RFID antenna at a first time, a first set of identifier signals in response to the first energization signal; transmitting, via the single RFID antenna, a second energization signal; receiving, by the single RFID antenna at a second time, a second set of identifier signals in response to the second energization signal; and identifying objects associated with at least one of the first set of identifier signals and the second set of identifier signals and that moved relative to the single RFID antenna between the first time and the second time.

DETAILED DESCRIPTION

Self-checkout is becoming an increasing popular method of processing transactions, but the technologies relied upon to identify items for checkout remain prone to error and the processes still require significant amounts of manual labor (e.g., having a patron use an optical scanner) and computing resources (e.g., for image recognition). RFID technologies offer benefits in accuracy and speed of self-checkout, while reducing demand for manual labor and computing resources compared to patron-performed barcode scanning or image recognition solutions, but are susceptible to errors from cross-interference (e.g., from nearby RFID signal sources) or shadowing (e.g., the occlusion or blocking of communications between scanner and tag) unless carefully managed. The present disclosure provides for the management of RFID scanning in self-checkout by providing for the coordinated use of several potentially interfering RFID signal sources and/or shadowed items by ensuring multiple scans of the items are performed by an RFID scanner when the items-to-scan are located at different locations relative to the RFID scanner. Stated differently, by enforcing rotation of a relative angle between an item and an RFID scanner during self-checkout, an RFID scanner can provide self-checkout with improved accuracy, speed, and computing efficiency.

Figure 1:
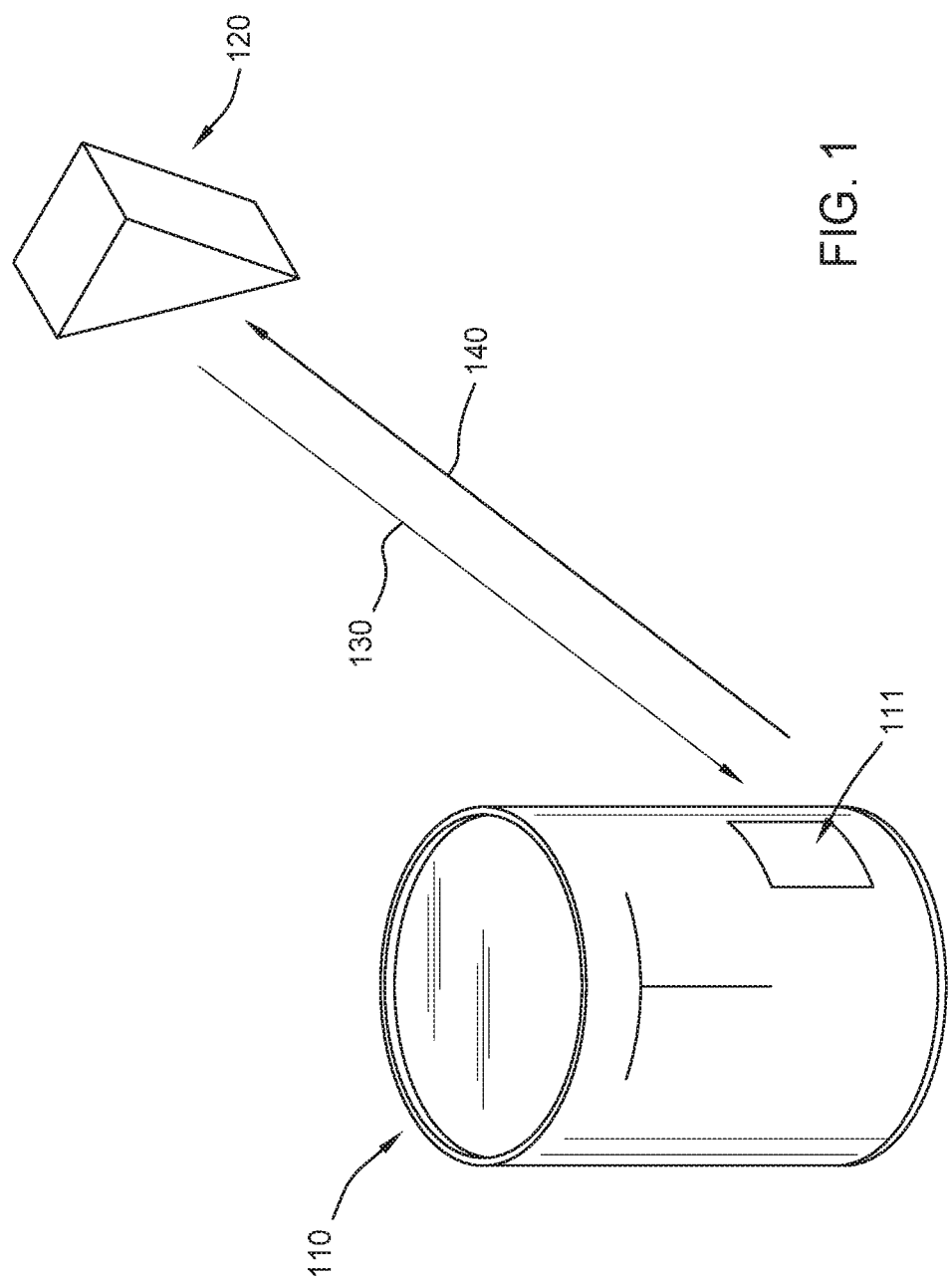
FIG. 1 illustrates an RFID scanning arrangement, according to embodiments of the present disclosure.

FIG. 1 illustrates an RFID scanning arrangement, according to embodiments of the present disclosure. In the RFID scanning arrangement, an object 110 is provided with an RFID tag 111, which interacts with an RFID antenna 120 to identify the object 110 associated with the RFID tag 111. The RFID tag 111 includes a radio transponder that is triggered by an excitation signal 130 transmitted from the RFID antenna 120 to produce an identifier signal 140. The identifier signal 140 include information about the object 110 associated with the RFID tag 111, which can include an object-type identifier and/or a unique identifier for the given object 110. For example, an object-type identifier can identify that the associated object 110 is a can of beans (rather than a can of corn, a tube of toothpaste, or a bag of beans), whereas unique identifiers can identify that the can of beans is a particular object 110 (e.g., can number X rather than can number Y).

Figure 2A:
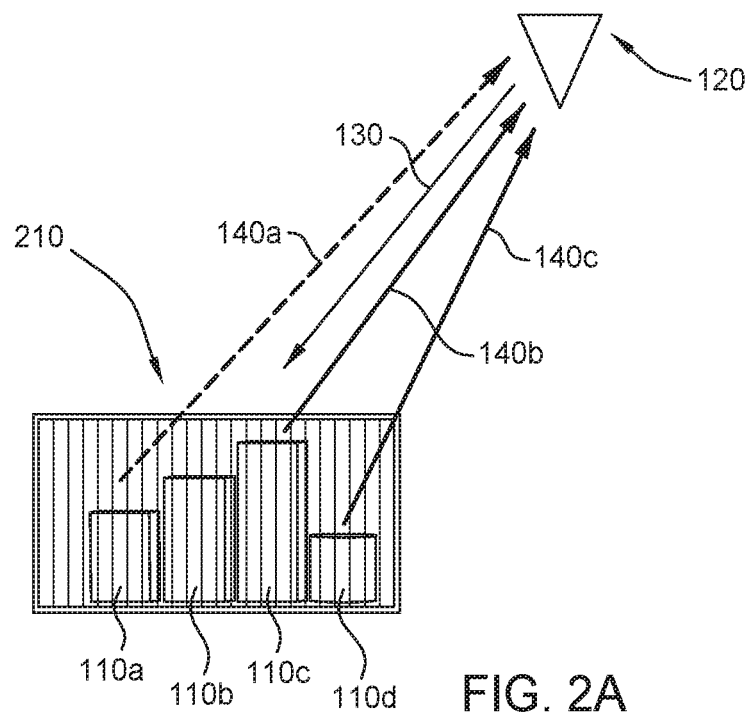
FIGS. 2A-2B illustrate relative repositioning in a bulk RFID scanning arrangement, according to embodiments of the present disclosure.
Figure 2B:
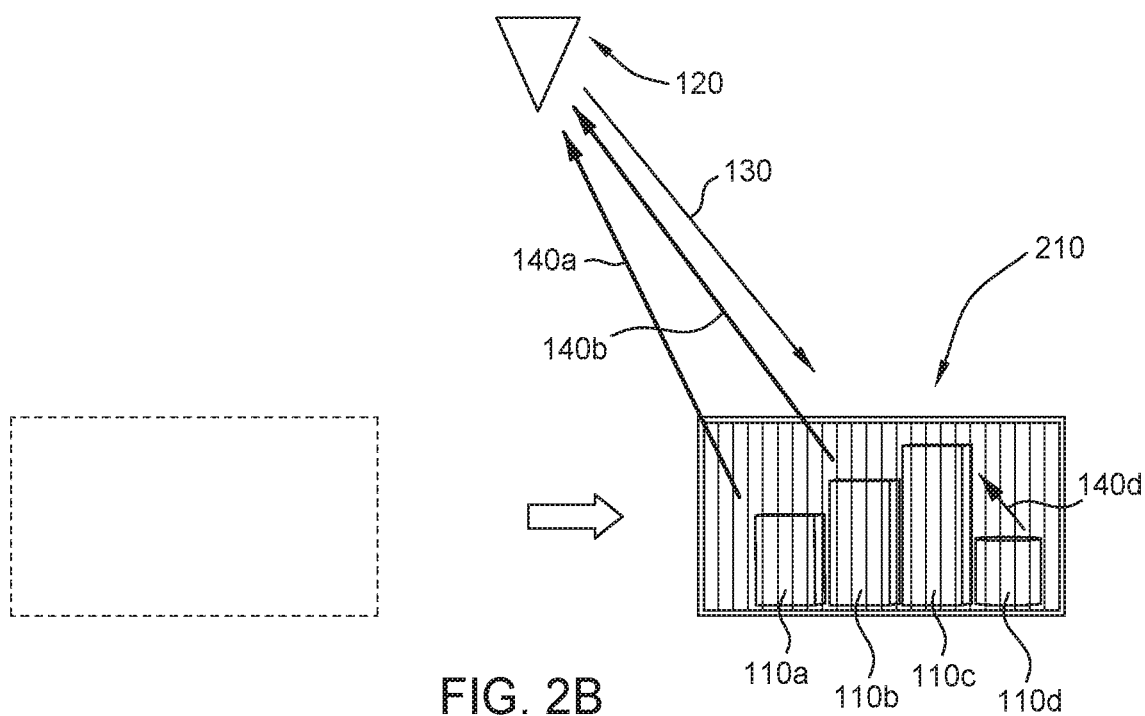

FIGS. 2A and 2B illustrate relative repositioning in a bulk RFID scanning arrangement, according to embodiments of the present disclosure. Bulk scanning is the process when an RFID antenna 120 attempts to read several RFID tags 111 at the same time. Each object 110a-d is individually tagged with an associated RFID tag 110a-d, but due to the proximity of the objects 110 to one another, the various objects 110 can fully or partially block the excitation signal 130, fully or partially block identifier signals 140, and/or the various identifier signals 140 can interfere with one another.

Consider then the examples shown in FIGS. 2A and 2B in which a container 210 (e.g., a bag, box, shopping basket, buggy, cart, skid, hand truck, wagon, etc.) including four objects 110a-d (with associated RFID tags 111a-d) are subjected to bulk scanning. In FIG. 2A, although the RFID antenna 120 has broadcast an excitation signal 130, only a first identifier signal 140a, a third identifier signal 140c, and a fourth identifier signal 140d are transmitted back to the RFID antenna 120; the first identifier signal 140a (associated with the first object 110a) is transmitted in an unintelligible state (e.g., below a threshold Signal to Noise Ratio (SNR) for the RFID antenna 120, with garbled data, etc.), and a second identifier signal 140b (associated with the second object 110b) is not transmitted. For example, the third object 110c or the container 210 may shadow the first and second objects 110a-b in FIG. 2A; blocking reception of the excitation signal 130 by the second objects 110b and blocking transmission of the first identifier signal 140a. Similarly, in FIG. 2B, the RFID antenna 120 broadcasts an excitation signal 130, but only receives a first identifier signal 140a, a second identifier signal 140b, and a third identifier signal 140c; the fourth identifier signal 140d is blocked from reaching the RFID antenna 120 (e.g., by the third object 110c and/or the container 210).

However, between the examples shown in FIGS. 2A and 2B, the RFID antenna 120 has received identifier signals 140 associated with each of the objects 110 in the container 210. Accordingly, by enforcing several readings of the objects 110 in a container 210 at several different relative angle to the RFID antenna 120, the RFID antenna 120 can reliably and accurately scan large groups of object 110 (e.g., to track for inventory purposes). By enforcing different relative angles of the objects 110 to the RFID antenna 120, negative arrangements of objects 110 can be mitigated with beneficial arrangements of objects 110. Although generally discussed in terms of a first arrangement (at a first time and first location relative to the RFID antenna 120) and a second arrangement (at a second time and second location relative to the RFID antenna 120), the present disclosure can be applied to further arrangements (e.g., third, fourth, nth). Additionally, although the present disclosure generally provides examples related to groups of objects 110 held in containers 210, it will also be appreciated that the present disclosure can be applied to individual objects 110 and loose collections of objects 110 (i.e., objects 110 not held in a container 210, such as objects 110 removed from a container 210 and placed on a checkout conveyor or platform).

Figure 3:
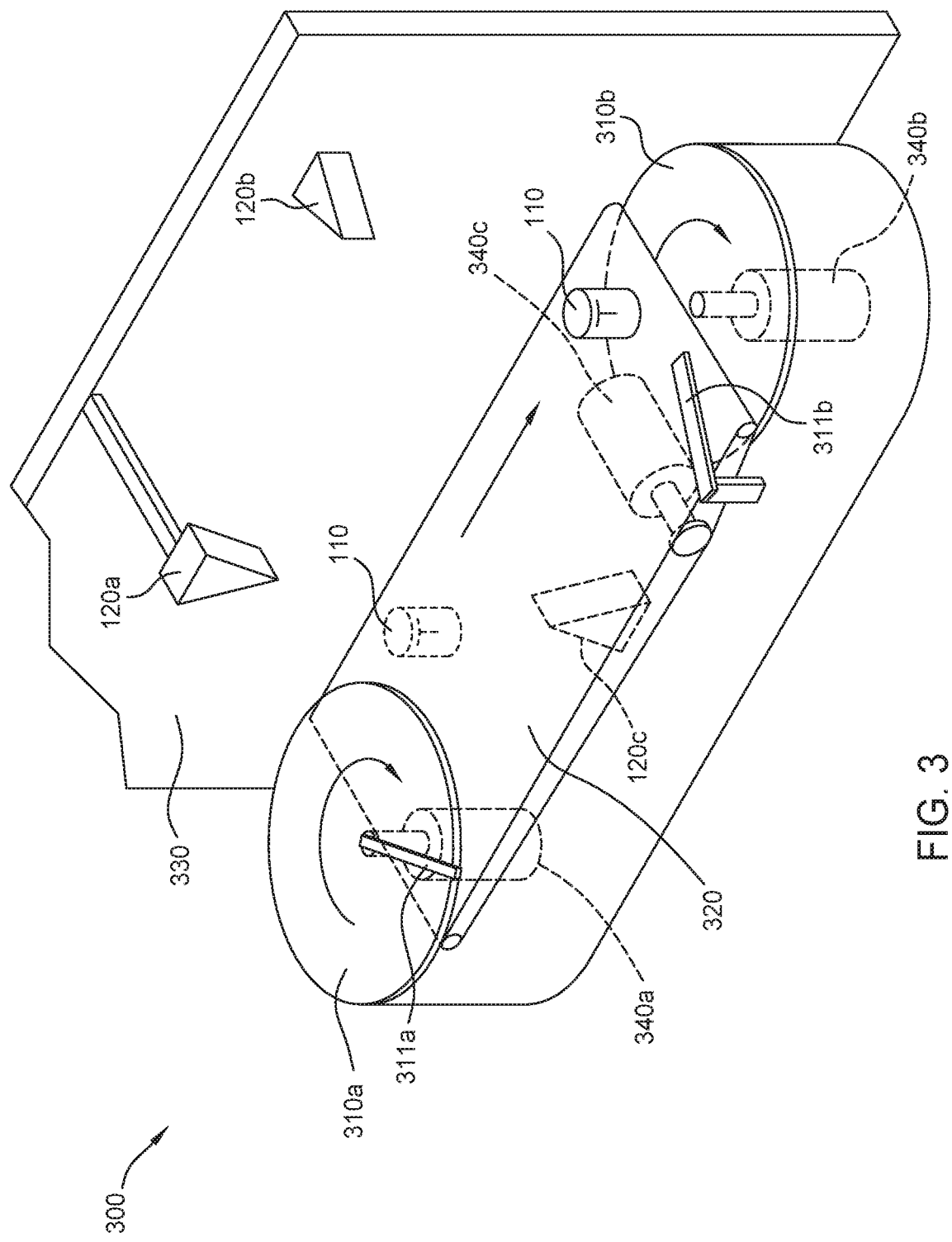
FIG. 3 illustrates counter-level pathways in a kiosk for RFID self-checkout, according to embodiments of the present disclosure.

FIG. 3 illustrates counter-level pathways in a kiosk 300 for RFID self-checkout, according to embodiments of the present disclosure. The counter level pathways include elevated tracks that, when activated by an associated motor, move items placed thereon. As shown, the kiosk 300 includes a first carousel 310a that includes a first motor 340a to move/rotate a first rounded (e.g., circular, ovoid) track or platform, a second carousel 310b that includes a second motor 340b to move/rotate a second rounded track or platform, and a linear conveyor 320 that includes a third motor 340c to move a linear track or belt. The kiosk 300 includes a shield wall 330 located in a plane perpendicular to the plane of travel along the first carousel 310a, linear conveyor 320, and/or second carousel 310b to block or attenuate excitation signals 130 and/or identifier signals 140 from one kiosk 300 being received at a different kiosk 300. Shield walls 330 are discussed in greater detail in regard to FIG. 5.

The linear conveyor 320 is shown between the first carousel 310a and the second carousel 310b so that items placed on the first carousel 310a rotate onto the linear conveyor 320, which delivers the items to the second carousel 310b. In various embodiments, the linear conveyor 320 can be omitted, and items are placed onto a first carousel 310a and are transferred directly from the first carousel 310a to the second carousel 310b. In various embodiments, the linear conveyor 320 can include a linear belt that carries objects to different locations in the kiosk 300 when driven by the third motor 340c, but can also include various tracks (e.g., chain links) that are driven the by third motor 340c.

In some embodiments, the first carousel 310a may be placed in an unloading area of the kiosk 300 (e.g., for a patron to unload items from a container 210 onto the conveyors for checkout, for a patron to move items from one container 210 (e.g., a buggy) to another (e.g., bags or boxes for easy transport), etc.). In some embodiments, the first carousel 310a may be omitted or replaced with a stationary or non-motorized (e.g., human-powered) unloading area. In various embodiments, the first carousel 310a includes a round platform that, when driven by the first motor 340a rotates and carries items placed thereon in a circular (or ovoid) pattern.

In some embodiments, the second carousel 310b may be placed in a post-checkout loading area of the kiosk 300 (e.g., for a patron to unload items from the conveyors that have been purchased and into a container 210 for easy transport). Although illustrated as rotating in the same direction as the first carousel 310a, in various embodiments, the second carousel 310b can rotate in a different direction than the first carousel 310a (e.g., clockwise versus counterclockwise). In various embodiments, various bags, boxes, etc., may be provided at the post-checkout area for ease of transport of items marked as purchased. In some embodiments, the second carousel 320a may be omitted or replaced with a stationary or non-motorized (e.g., human-powered) unloading area. In some embodiments, the kiosk 300 can omit the first carousel 310a and the linear conveyor 320; including only the second carousel 310b.

In various embodiments, the first carousel 310a and/or second carousel 310b include a round platform that, when driven by the respective motor 340, rotates and carries items placed thereon in a circular (or ovoid) pattern. In some embodiments the first carousel 310a and/or second carousel 310b include an articulated track formed over a closed path that, when driven by the respective motor 340, drives the articulated track in a circular (or ovoid) pattern and carried items placed thereon in the circular (or ovoid) pattern. In various embodiments, the first carousel 310a and/or the second carousel include a respective first blocker bar 311a or a second blocker bar 311b in the path of travel. The first blocker bar 311a prevents items placed on the first carousel 310a from making more than one circuit and to push those items (passively or actively) onto a next portion of the track in the kiosk 300. The second blocker bar 311b prevents items placed on the second carousel 310b from making a full circuit and to avoid interfering with prior portions of the track in the kiosk 300 and/or to push those items (passively or actively) off of the second carousel 310b (e.g., into a waiting container 210).

As items are placed onto the various tracks of the first carousel 310a, linear conveyor 320, and/or second carousel 310b, one or more RFID antennas 120 can scan those items to identify which items are being carried through the kiosk 300. In various embodiments, a single RFID antenna 120 is used in the kiosk 300, which may be any of an above-track antenna 120a, a sub-track antenna 120b, or an angled antenna 120c. The motion imparted by the various tracks enable an RFID antenna 120 (whether singly or in conjunction with other RFID antennas 120) to send excitation signals 130 to the items at different relative angles to the RFID antenna 120, and to receive identifier signals 140 from the items at different relative angles to the RFID antenna 120 (e.g., moving one or more objects 110 or container 210 including one or more objects 110 from a first location to a second location as in FIGS. 2A and 2B).

An above-track antenna 120a describes an RFID antenna 120 that is part of the kiosk 300 (or otherwise associated with the kiosk 300) that projects excitation signals 130 generally downward to a track (of one or more of the first carousel 310a, linear conveyor 320, and/or second carousel 310b) that is located below the RFID antenna 120.

A sub-track antenna 120b describes an RFID antenna 120 that is part of the kiosk 300 (or otherwise associated with the kiosk 300) that projects excitation signals 130 generally upward to a track (of one or more of the first carousel 310a, linear conveyor 320, and/or second carousel 310b) that is located above the RFID antenna 120. Although illustrated as being incorporated in the linear conveyor 320, a sub-track antenna 120b can also be incorporated into a carousel (e.g., the first carousel 310a or second carousel 310b).

An angled antenna 120c describes an RFID antenna 120 that is part of the kiosk 300 (or otherwise associated with the kiosk 300) that projects excitation signals 130 generally laterally to a track (of one or more of the first carousel 310a, linear conveyor 320, and/or second carousel 310b) that is located below or at the same level as the RFID antenna 120.

Regardless of whether the kiosk uses a single RFID antenna 120 or several coordinated RFID antennas 120, the kiosk 300 is able to position and reposition items at two or more times at different locations relative to the RFID antenna(s) 120 to identify various objects 110 that may have been shadowed by other items on the tracks, and thereby identify which objects 110 to include, to add to, or remove from an inventory (e.g., for a purchase and/or for restocking and inventory management).

FIGS. 4A-4D illustrate floor-level pathways in a kiosk 400 for RFID self-checkout, according to embodiments of the present disclosure. In addition to raised tracks (e.g., as in the kiosk 300 discussed in relation to FIG. 3), a kiosk 400 can define a pathway (mobile or stationary) that a container 210 (e.g., a shopping buggy, cart, skid, hand truck, wagon, etc.) can travel to reposition one or more objects 110 contained therein at different relative angles to one or more RFID antennas 120 associated with the kiosk 400.

Similarly to raised pathways, kiosks 400 with floor-level pathways can include a shield wall 330 that blocks physical and/or electromagnetic access to the pathway of the kiosk 400 in at least one plane (while leaving the pathway accessible in other planes). Additionally, one or more RFID antennas 120 can be positioned in a kiosk 400 with a floor-level pathway, including any of an above-track antenna 120a, a sub-track antenna 120b/120d, or an angled antenna 120c. The motion imparted by the various tracks enable an RFID antenna 120 (whether singly or in conjunction with other RFID antennas 120) to send excitation signals 130 to the items at different relative angles to the RFID antenna 120, and to receive identifier signals 140 from the items at different relative angles to the RFID antenna 120 (e.g., moving one or more objects 110 or container 210 including one or more objects 110 from a first location to a second location as in FIGS. 2A and 2B).

Figure 4A:
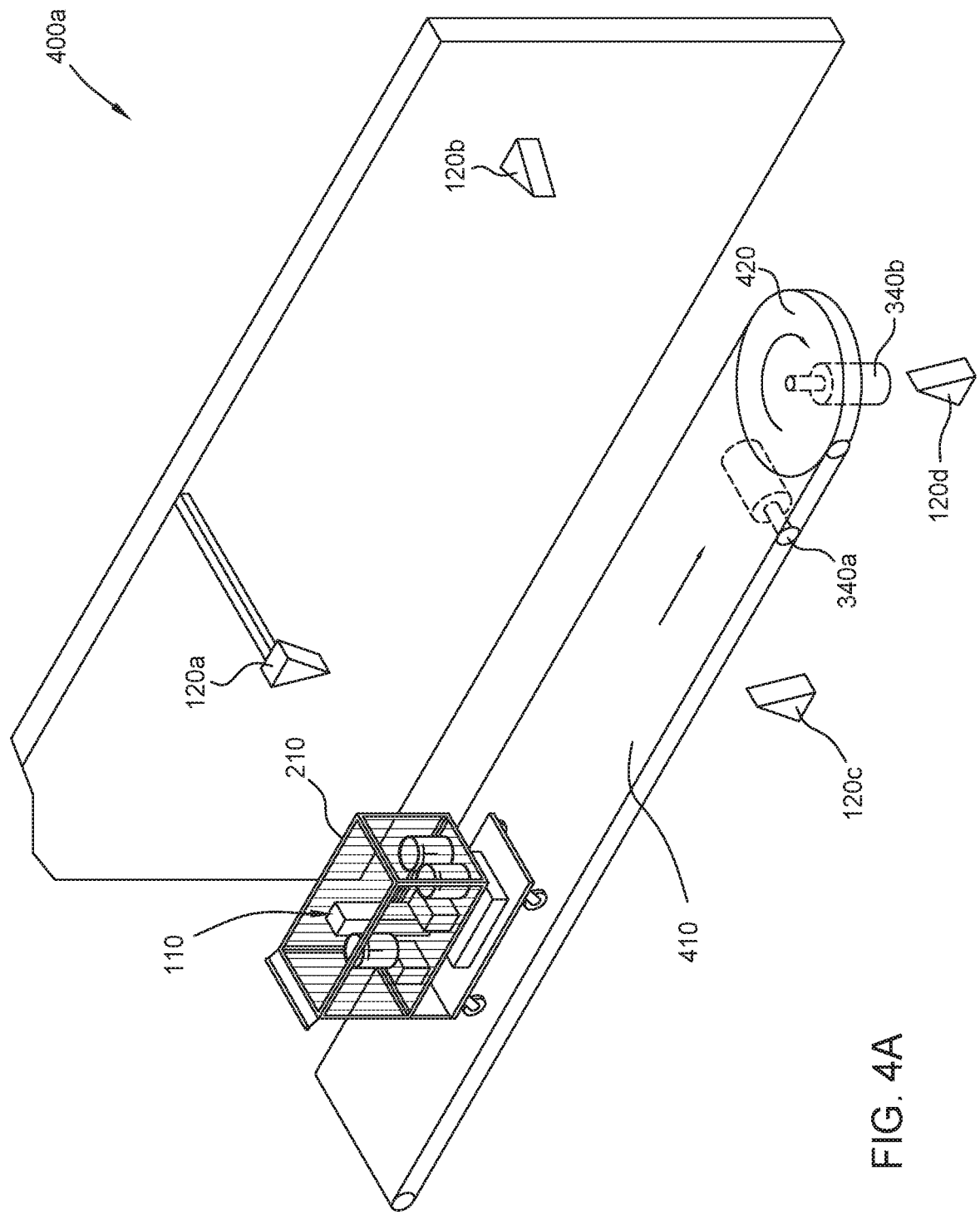
FIGS. 4A-4D illustrate floor-level pathways in a kiosk for RFID self-checkout, according to embodiments of the present disclosure.

FIG. 4A illustrates an example motorized pathway for use in a kiosk 400 for RFID-based self-checkout. Similarly to the raised track pathway in FIG. 3, the floor-level pathway in FIG. 4A can include one or more of a linear conveyor 410 and a carousel 420.

The linear conveyor 410 incudes a first motor 340a that drives a track or belt that, when engaged, moves any item placed thereon from a first side to a second side of the kiosk 400. In various embodiments, the linear conveyor 410 is configured to allow a person to walk or stand thereon in addition to a container 210 and/or one or more object 110. One or more sub-track antennas 120b can be positioned at various locations along the linear conveyor 410 between the loops of belts/tracks or under the looped belt/track.

The carousel 420 includes a second motor 340b to move/rotate a rounded (e.g., circular, ovoid) track or platform. When engaged, the carousel 420 rotates any item placed thereon, which can include one or more full rotations (i.e., rotation having a multiple of 360 degrees) and/or partial rotations (e.g., a rotation of less than 360 degrees). In various embodiments, the carousel 420 is configured to allow a person to walk or stand thereon in addition to a container 210 and/or one or more object 110. One or more sub-track antennas 120d can be deployed at various positions under the track/platform of the carousel 420.

In embodiments including both a linear conveyor 410 and a carousel 420, the rotating platform of the carousel 420 can be positioned over the belt or track of the linear conveyor 410 (as is illustrated in FIG. 4A), or the linear conveyor 410 and the carousel 420 can be positioned with a gap between one another.

Figure 4B:
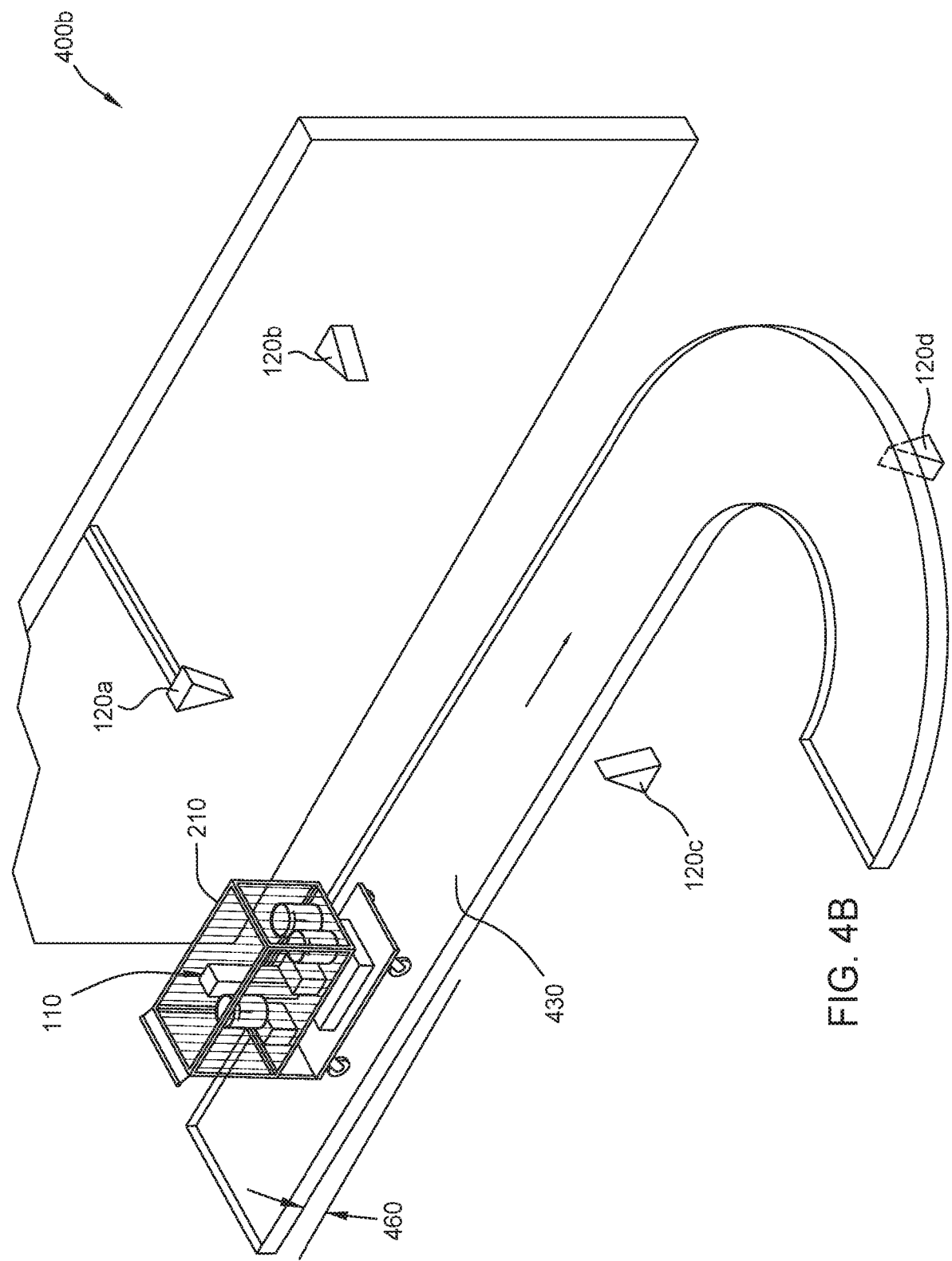

FIG. 4B illustrates an example gravity-assisted pathway for use in a kiosk 400 for RFID-based self-checkout. A trackway 430 that includes one or more of a linear section and a curved section are positioned at an angle 460 relative to a level floor so that an object 110 or container 210 placed at a first end of the trackway 430 will roll or slide to a second end. Accordingly, the one or more objects 110 placed on the trackway 430 are induced via gravity to move to different locations on the trackway 430 relative to the one or more RFID antennas 210 associated with the kiosk 400.

Figure 4C:
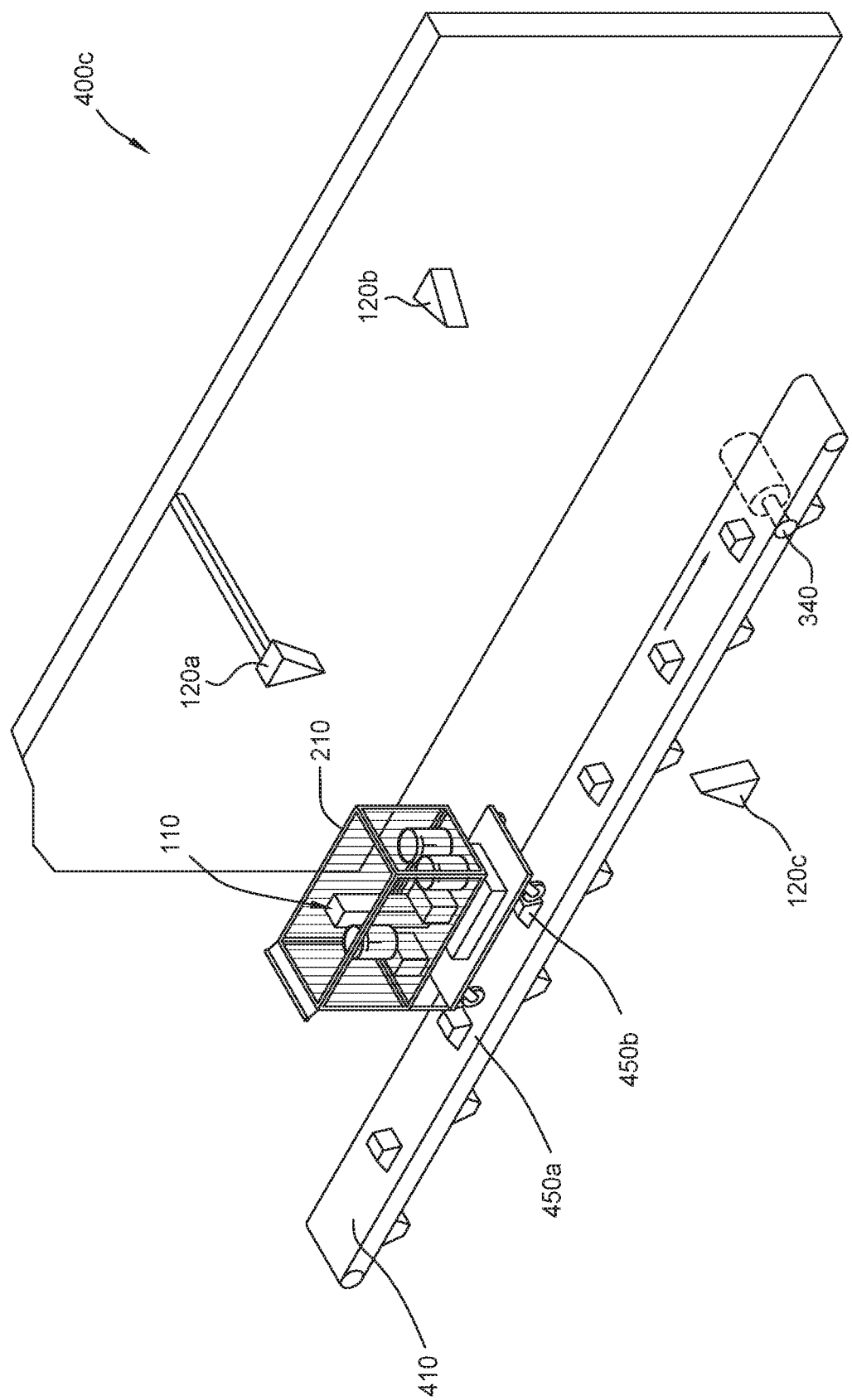

FIG. 4C illustrates an example chocked pathway for use in a kiosk 400 for RFID-based self-checkout. In various embodiments, a chocked linear conveyor 450a includes one or more chocks 450b. The chocks 450b are spaced at intervals along the chocked linear conveyor 450a and are configured to engage with a portion of a container 210 (e.g., one or two wheels on a shopping cart) to move that container 210 from a first position to a second position in the kiosk 400. In various embodiments, the chocks 450b can occupy some or all of the width of the chocked linear conveyor 450a. In various embodiments, the chocked linear conveyor 450a includes an un-chocked portion configured to allow a person to stand on to thereby be conveyed from a first side of the kiosk 400 to a second side. In some embodiments, the chocked linear conveyor 450a is positioned next to a non-motorized walkway provided for a person to walk behind or to the side of the container 210 as the chocked linear conveyor 450a moves the container 210 from a first side of the kiosk 400 to a second side.

Figure 4D:
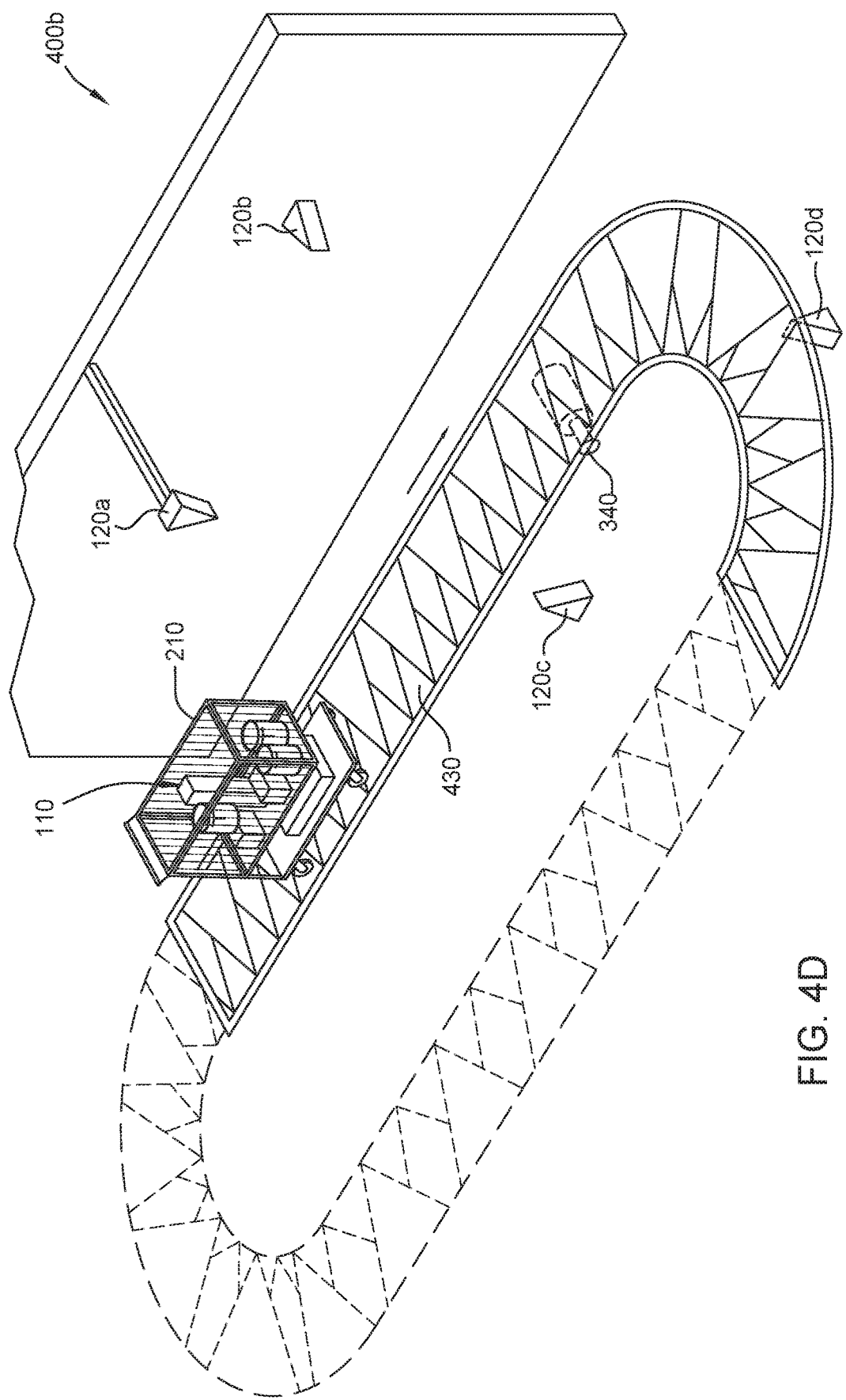

FIG. 4D illustrates an example articulated pathway for use in a kiosk 400 for RFID-based self-checkout. The articulated pathway 440 is composed of several overlapping scales that articulate to slide over or under one another over a circular or ovoid pathway, when driven by an associated motor 340. In various embodiments, the articulated pathway 440 is partially exposed (as is illustrated in FIG. 4D) to define linear and curved sections or can be fully exposed to define a circular or ovoid path.

Figure 5:
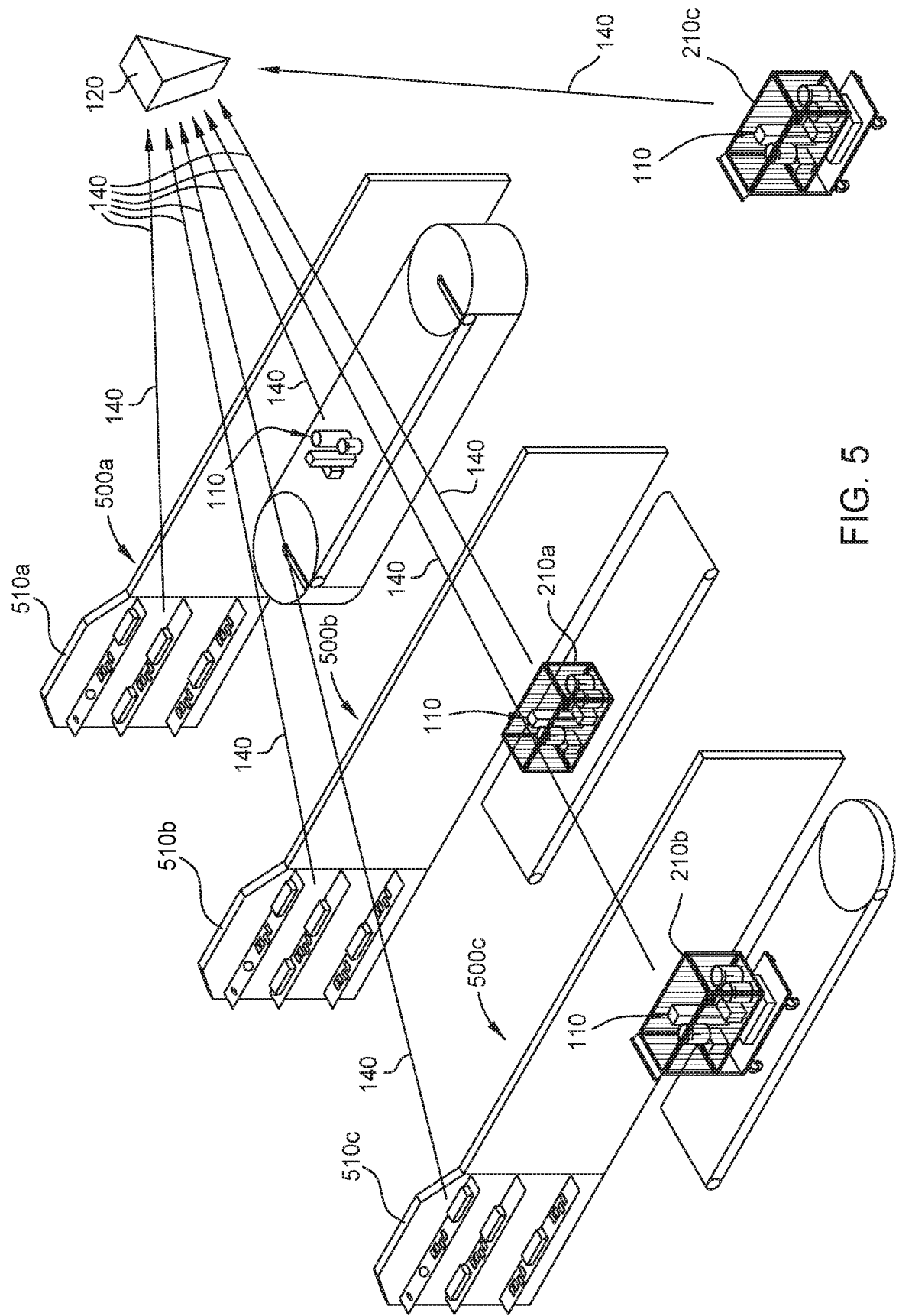
FIG. 5 illustrates a checkout station including several kiosks for RFID self-checkout, according to embodiments of the present disclosure.

FIG. 5 illustrates a checkout station 500 including several kiosks for RFID self-checkout, according to embodiments of the present disclosure. The kiosks included in the checkout station 500 can include variants of the kiosks 300 and 400 discussed in relation to FIGS. 3 and 4A-4D, as well as other kiosks (e.g., staffed kiosks, barcode antenna based self-checkout kiosks, camera and/or computer vision based shelf-checkout kiosks, etc.).

The checkout station 500 is generally positioned in a threshold of a building so that objects located inward relative to the checkout station 500 are considered part of the stock or inventory of the building, while objects located outward relative to the checkout station are considered part of the stock or inventory of a third party (e.g., purchased items, items brought for delivery). To make full use the threshold space, a proprietor can group several kiosks at the threshold, but by having several kiosks in close proximity, signals generated by one kiosk can interfere with signals generated by the other kiosks.

The RFID antenna 120 illustrated in the checkout station 500 may be associated with any one of the kiosks or may be a master-antenna associated with more than one kiosk. Due to the proximity of the kiosks, the RFID antenna 120 is (intentionally and/or unintentionally) able to send excitation signals 130 to and/or receive identifier signals 140 from objects 110 located in more than one kiosk and/or outside of the kiosks. To reduce the likelihood of the RFID antenna 120 interfering with or receiving interference from another RFID antenna 120, and to differentiate objects 110 located in different kiosks, one or more strategies can be exercised in a checkout station 500.

In some embodiments, the shield walls 330 of the individual kiosks can help the proprietor group the kiosks closer to one another by reducing the signal strength of generated excitation signals 130 received from the RFID antennas 120 associated with other kiosks and/or by reducing the signal strength of generated identifier signals 140 received from the tags 111 of objects 110 located in other kiosks and/or outside of the kiosks. In some embodiments, the shield walls 330 are made of materials that are radio opaque in the frequencies used for RFID scanning, so that any RFID signal that is received by the shield wall 330 is reflected away from an adjacent kiosk and/or is attenuated to reduce the strength of that signal.

The shield walls 330 are constructed in a plane perpendicular to the path of travel through the kiosk (whether elevated as in FIG. 3 or floor-level as in FIGS. 4A-4D) while still allowing access to the path of travel. For example, a shield wall 330 may be constructed in a first plane (e.g., "behind" a plane in which the user loads the tracks from and perpendicular to a path of travel), but allows access to the path of travel in at least one other plane. When several kiosks are grouped together into a checkout station 500, the shield walls 330 of adjacent kiosks can help contain and/or block RFID signals in the individual kiosks.

In addition to the shield walls 330, several kiosks can be in communication with one another to share information related to scanned items to avoid identifying an item scanned at one kiosk as also being scanned at another kiosk. For example, a first kiosk can scan an item with a unique identifier associated therewith and identify that unique item to the other kiosks, so that if an RFID antenna 120 associated with another kiosk also received an identifier signal 140 carrying the unique identifier, the other kiosk can ignore that identifier signal 140 or otherwise not treat that item as being scanned at the associated kiosk. Stated differently, by knowing that another kiosk has already scanned an item, a kiosk can know not to treat that item as being scanned locally.

Figure 6A:
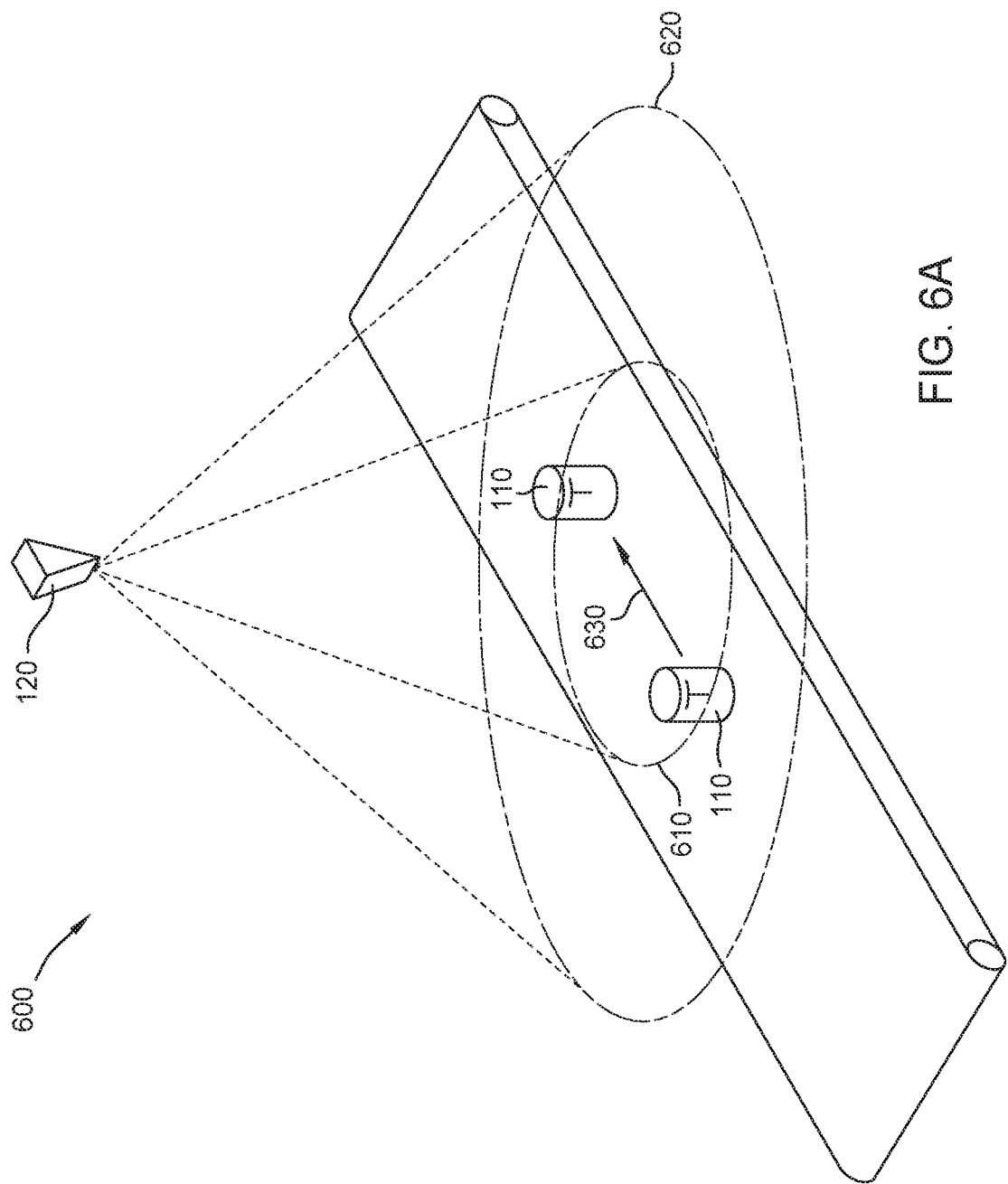
FIGS. 6A-6C illustrate signaling zones of an RFID scanner, according to embodiments of the present disclosure.
Figure 6B:
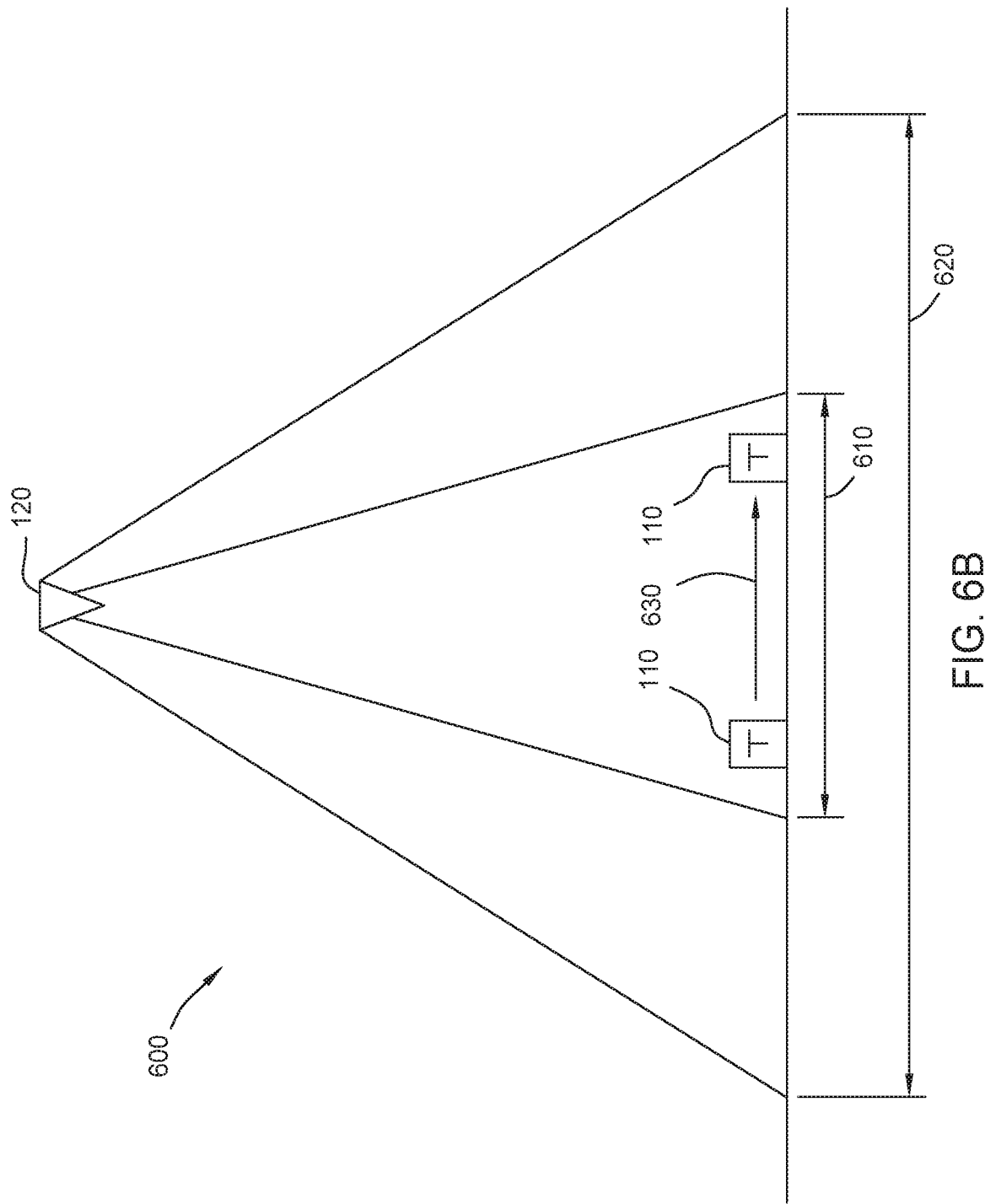
Figure 6C:
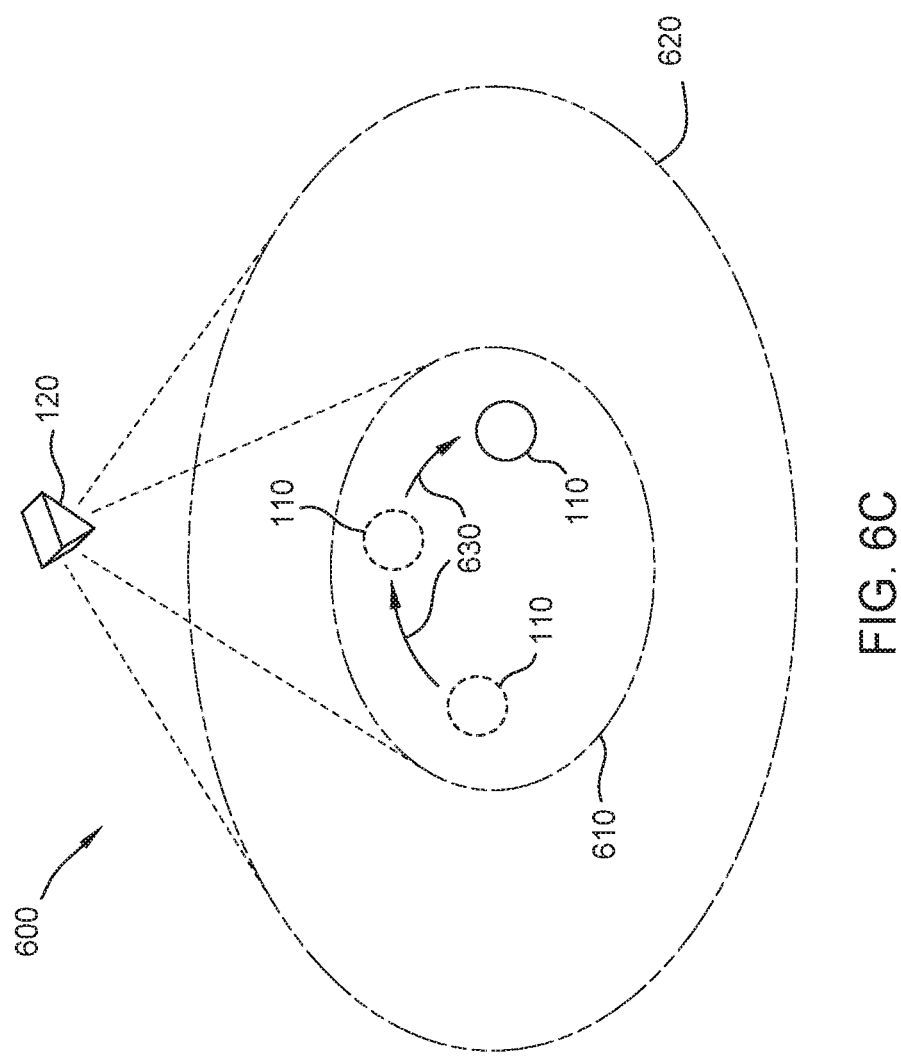

In various embodiments, the RFID antennas 120 associated with the kiosks can perform various distance measurements to determine whether a given identifier signal 140 (and therefore a given tag 111 and object 110) is located within the kiosk or a designated sub-region (e.g., a scanning zone 610, such as discussed in greater detail in regard to FIG. 6A-6C) of the kiosk. When a distance to the item is outside of the kiosk or designated sub-region, the RFID antenna 120 can ignore that item or otherwise not include the item in a transaction. For example, items located inward from the threshold relative to the kiosk can be ignored as being part of an inventory and items located outward from the threshold relative to the kiosk can be ignored as being part of a completed transaction. Furthermore, the RFID antenna 120 can use the distance measurements to identify stationary objects that are not part of a checkout transaction, but may be present in the kiosk. For example, the endcaps 510a-c or in-aisle shelves (often offering candy, snacks, novelties, staple items, etc.) can include several items that receive excitation signals 130 and produce identifier signals 140 that the RFID antenna 120 ignores unless the items are identified as moving along the path of travel and/or in a designated sub-region of the kiosk.

FIGS. 6A-6C illustrate signaling zones of an RFID antenna 120, according to embodiments of the present disclosure. FIG. 6A illustrates an isometric view of an object 110 being scanned by an RFID antenna 120 when traveling through the scanning pathway of a kiosk. In various embodiments, the RFID antenna 120 emits excitation signals 130 in various defined ranges, which can include the overall, maximum, or total signaling range 620 and a scanning zone 610. The signaling range 620 describes the range from the RFID antenna 120 at which the excitation signal 130 has sufficient strength to induce a tag 111 to generate an identifier signal 140 with sufficient strength to be interpreted by the RFID antenna 120 on receipt, and may extend outside of the kiosk. In contrast, the scanning zone 610 is a subset of the signaling zone 620 that is confined to the path of travel through the associated kiosk. In various embodiments, the scanning zone 610 is defined as a predefined distance from the RFID antenna 120, and the RFID antenna 120 is aligned with the path of travel through the kiosk to position the scanning zone 610 over some or all of the path of travel.

When an object 110 travels through the scanning zone 610, the RFID antenna 120 receives multiple identifier signals from the RFID tag 111 associated with the object 110 at multiple positions from within the scanning zone 610 at corresponding times. Depending on the layout of the pathway, the presence of other objects 110 and/or funneling elements (e.g., bumpers, blocker bars 311) in the pathway, a given object 110 can travel along various trajectories. For example, when an object 110 travels on a linear pathway, as is shown in FIG. 6B, the object 110 moves from a first position (at a first time) to a second position (at a second time) and can produce a first identifier signal 140a and a second identifier signal 140b and the associated positions that the RFID antenna 120 can receive to track the object 110 through the scanning zone 610. In another example, when an object 110 travels on a curved pathway (e.g., on a carousel or a curved track), as is shown in FIG. 6B, the object 110 moves in a curved trajectory to be located at a first position (at a first time) to a second position (at a second time) and to a third position (at a third time) that reposition the object 110 to provide different surfaces towards the RFID antenna 120. By reorienting the object 110 to the RFID antenna 120, a curved trajectory can expose the object 110 from behind other objects 110, face an RFID tag 111 towards the RFID antenna 120 and generally provide different transmission conditions for RFID signaling, and thus ensure more opportunities for the RFID antenna 120 to identify the object 110.

In various embodiments, the RFID antenna 120 can define several different and/or overlapping scanning zones 610 with known distances and/or locations to further aid in processing objects 110 in a kiosk. In some embodiments, the kiosk includes several RFID antennas 120 that each define different scanning zones 610 for different purposes in processing objects in a kiosk. For example, a supplemental scanning zone 610 can be identified as a return zone, so that an object 110 unintentionally scanned can be removed from a transaction. In a further example, a supplemental scanning zone 610 can be used to identify when an item has entered the kiosk so that any motors 340 associated with the pathway(s) are activated to move objects through the kiosk and are deactivated when objects are not located in the kiosk.

Figure 7:
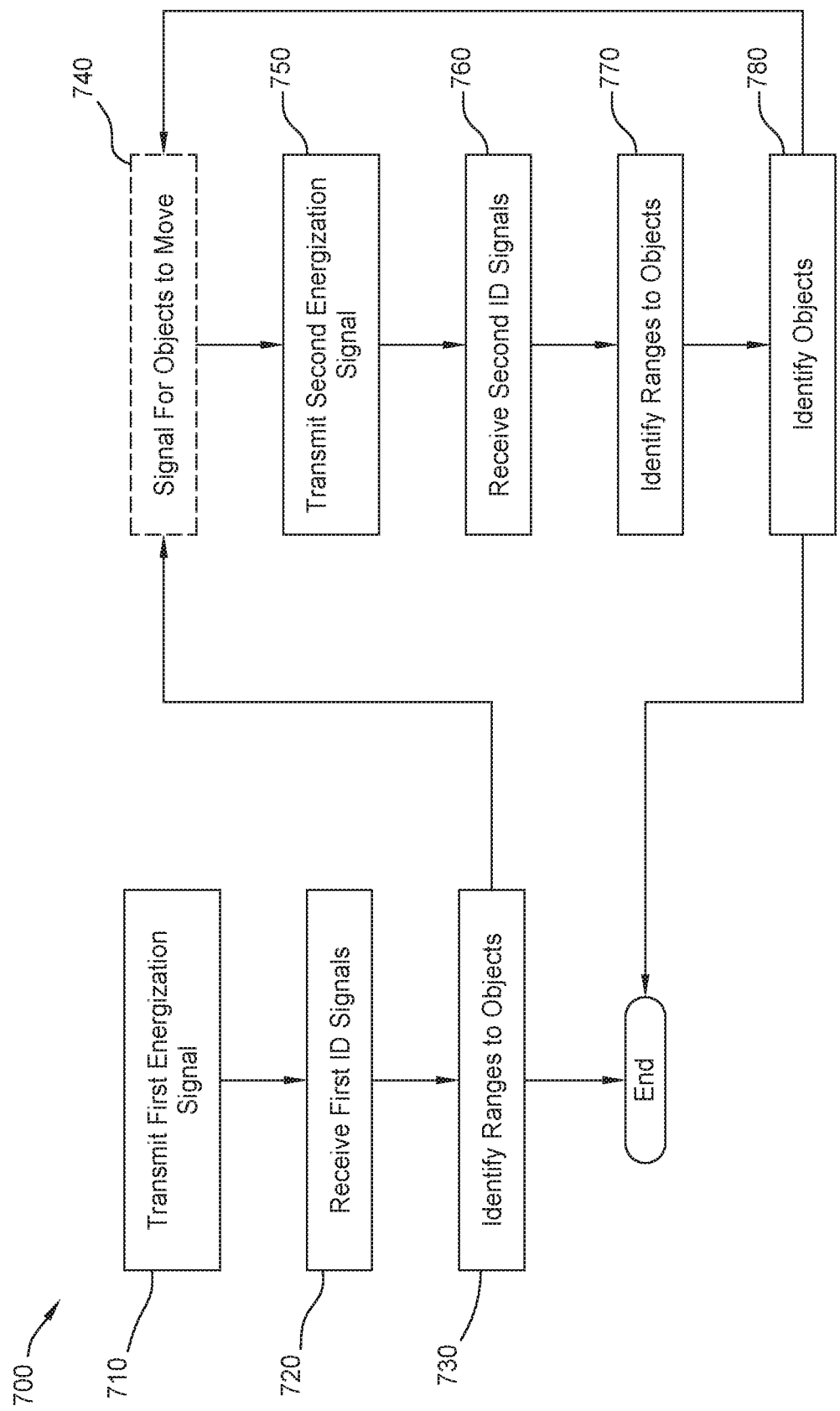
FIG. 7 is a flowchart of a method for RFID scanning, according to embodiments of the present disclosure.

FIG. 7 is a flowchart of a method 700 for RFID scanning, according to embodiments of the present disclosure. Method 700 begins at block 710, where a first RFID antenna transmits a first energization signal. In various embodiments, the RFID antenna transmits the first energization signal at a known rate (e.g., every 500 ms).

At block 720, the RFID antenna receives a first set of one or more identifier signals generated by RFID tags (associated with one or more objects) in response to the first energization signal. This first set of one or more identifier signals is received at a first time, when the objects are located at a first location (e.g., at an unloading side of a checkout kiosk).

At block 730, the RFID antenna identifies the ranges to the objects from which the identifier signals were received in block 720. When the ranges to the objects are outside of the scanning zone of the RFID antenna (e.g., the objects are located in a different kiosk or outside of the kiosk), method 700 can conclude. When the ranges to the objects indicated that the objects are within the scanning zone of the RFID antenna, method 700 proceeds to block 740. In various embodiments, the ranges to the objects can be determined based on one or more of: a signal strength of the identifier signal, a time of flight between when the excitation signal was generated and the identifier signal received, a phase of the identifier signal, etc.

At block 740, the RFID antenna optionally signals for the object identified as in-range in block 730 to move through the kiosk. In various embodiments, the RFID antenna can activate a motor associated with a track in the kiosk (e.g., a carousel, a linear conveyor) and/or signal a human operator to proceed with checkout (e.g., an audio signal to "please place your basket on the conveyor when ready"). In some embodiments, block 740 can be omitted if the kiosk includes a passive movement system for the objects placed therein (e.g., a sloped pathway), an operator powered movement system (e.g., a manually rotated carousel), or a motorized movement system that is controlled by a means other than an RFID antenna (e.g., a switch, an optical scanner, a pressure plate) or that is "always on".

At block 750, the RFID antenna transmits a second energization signal at a later time than the first energization signal, and at block 760, the RFID antenna receives a second set of one or more identifier signals generated by RFID tags (associated with one or more objects) in response to the second energization signal. This second set of one or more identifier signals is received at a second time, when the objects are located at a second location.

At block 770, the RFID antenna identifies the ranges to the objects from which the identifier signals were received in block 760. In various embodiments, the ranges to the objects can be determined based on one or more of: a signal strength of the identifier signal, a time of flight between when the excitation signal was generated and the identifier signal received, a phase of the identifier signal, etc.

At block 780, the RFID antenna (or a computing device associated with one or more RFID scanners) determines which objects to include in an ongoing transaction based on which objects associated with at least one of the first set of identifier signals and the second set of identifier signals have moved relative to the RFID antenna between the first time and the second time.

In various embodiments, when the RFID antenna determines that an object has not moved between the first and second times (e.g., the ranges in block 730 and 740 are the same), the RFID antenna ignores any identifier signals received from that object. For example, the RFID antenna could detect a candy bar located in an endcap or shelf associated with the kiosk that remains stationary because the customer has not chosen to remove the candy bar from the shelf and purchase it. In a further example, a customer may be in the process of unloading a shopping cart, and until the object is placed on a conveyor or carousel, could elect not to purchase that object. In an additional example, an object that has passed through the kiosk and is loaded into a cart to transport away from the kiosk may remain stationary as other objects are scanned.

When an object has moved within the scanning zone between the first time and the second time, the RFID antenna can add that item to an ongoing transaction. The RFID antenna, however, can ignore objects seen multiple times and that are already part of the ongoing transactions (e.g., based on a unique identifier included in the identifier signal).

Method 700 may return to block 740 to optionally continue scanning additional objects at subsequent times and additional positions relative to the RFID antenna, or may conclude. On conclusion of method 700, a customer may be prompted to confirm the objects identified in method 700 and complete the transaction.

Figure 8:
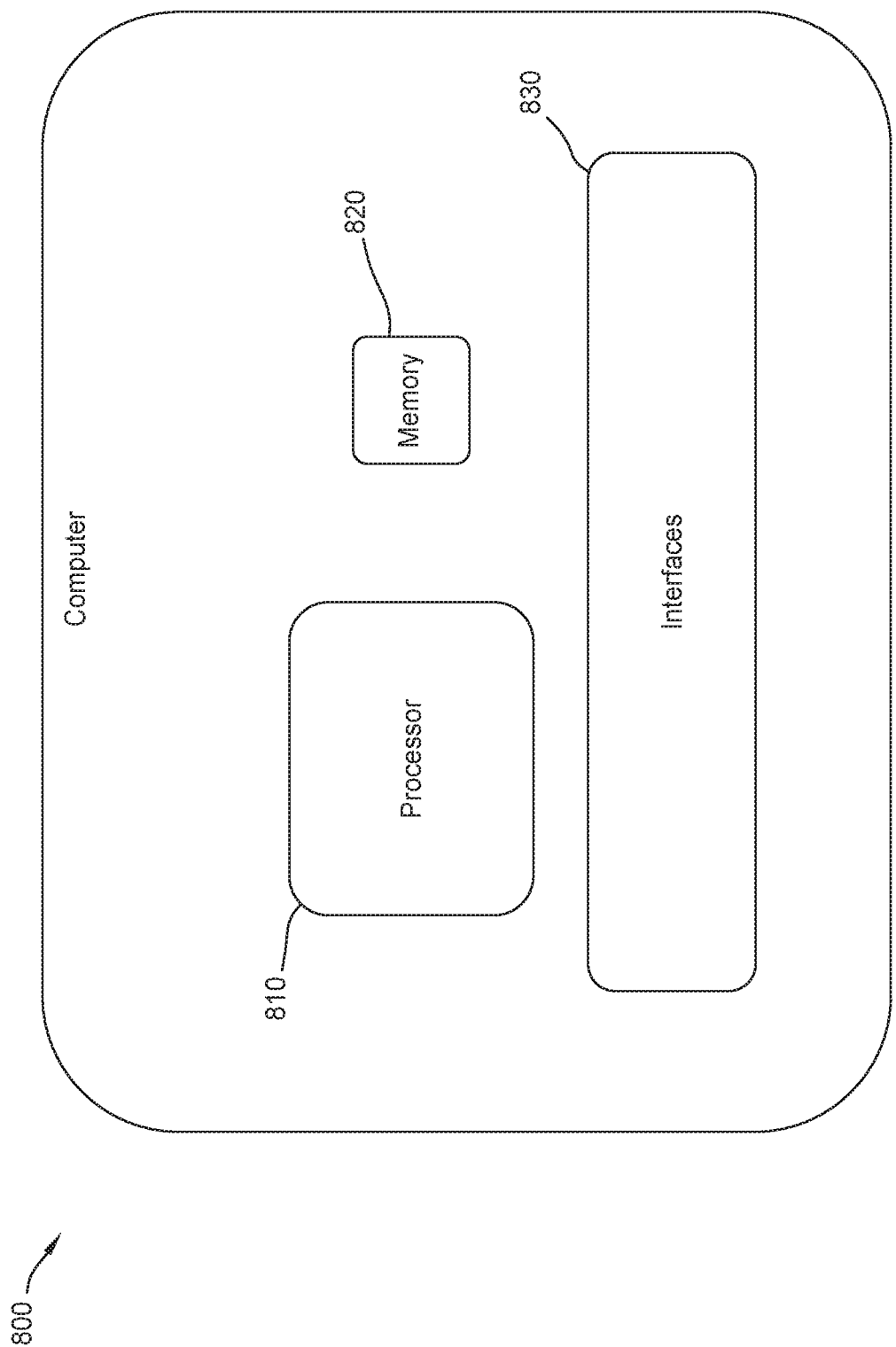
FIG. 8 illustrates a computing device, according to embodiments of the present disclosure.

FIG. 8 illustrates a computing device 800, according to embodiments of the present disclosure. The computing device 800 includes a processor 810, a memory 820, and an interface 830, and may include other components such as a microphone, a speaker, a power supply, additional storage, additional input devices, and additional output devices. The computing device 800 is generally under the control of an operating system (not shown). The processor 810 is included to be representative of a single CPU (central processing unit), multiple CPUs, a single CPU having multiple processing cores, and the like The memory 820 may be a persistent or a volatile storage device. Although the memory 820 is shown as a single unit, the memory 820 may be a combination of fixed and/or removable non-transient computer readable memory storage devices, such as fixed disc drives, solid state drives, SAN storage, NAS storage, removable memory cards or optical storage. The memory 820 may be part of one virtual address space spanning multiple primary and secondary storage devices.

As shown, the memory 820 includes various applications 823 (including Operating Systems for the computing device 800).

The interfaces 830 may be any type of device to manage input to or output from the computing device 800 and can include connections to the RFID antenna 120 signal when to generate excitation signals 130, and to receive and interpret identifier signals 140. The interfaces 830 can also include direct or networked connected to/from various inventory control systems, point of sale (POS) terminals, and to enable the computing device 800 to communicate with other computers (e.g., NFC scanners, WiFi antennas, cell antennas, Ethernet ports, Bluetooth antennas, etc.).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a first product pathway in a self-checkout kiosk;
a single Radio Frequency Identifier (RFID) antenna in the self-checkout kiosk, having a first scanning zone aligned with the first product pathway;
wherein the first product pathway is configured to:
position a first set of objects within the first scanning zone at a first position relative to the single RFID antenna at a first time; and
position the first set of objects within the first scanning zone at a second position relative to the single RFID, different than the first position, at a second time; and
wherein the single RFID antenna is configured to:
receive, at the first time, a first set of identifier signals associated with at least some of the first set of objects;
receive, at the second time, a second set of identifier signals associated with at least some of the first set of objects;
responsive to determining at least some of the first set of objects are detected in both the first and second set of identifier signals, determine whether the at least some of the first set of objects have been added to a transaction at the self-checkout kiosk; and
responsive to determining that the at least some of the first set of objects have not been added, add the at least some of the first set of objects to the transaction.

2. The system of claim 1, wherein the single RFID antenna is further configured to:
identify objects from the first set of objects identified in at least one of the first set of identifier signals and in the second set of identifier signals via unique identifiers.

3. The system of claim 1, further comprising:
a second RFID antenna, having a second scanning zone aligned with the first product pathway;
wherein the second RFID antenna is configured to:
receive, at the first time, a third set of identifier signals associated with at least some of the first set of objects;
receive, at the second time, a fourth set of identifier signals associated with at least some of the first set of objects; and
coordinate with the single RFID antenna to identify objects from the first set of objects identified in at least one of the first set, second set, third set, and fourth set of identifier signals via unique identifiers associated with each object in the first set of objects.

4. The system of claim 1, further comprising:
a second RFID antenna, having a second scanning zone aligned with the first product pathway, wherein the second scanning zone is different from the first scanning zone;
wherein the second RFID antenna is configured to:
receive, at the first time, a third set of identifier signals associated with at least some of a second set of objects;
receive, at the second time, a fourth set of identifier signals associated with at least some of the second set of objects; and
coordinate with the single RFID antenna to identify objects from the first set of objects identified in at least one of the first set and second set of identifier signals that are also identified in at least one of the third set and fourth set of identifier signals and remove objects belonging to the second set of objects from the first set of objects via unique identifiers associated with each object in the first set of objects.

5. The system of claim 1, further comprising:
radio frequency shielding disposed in a first plane perpendicular to a second plane of travel of the first product pathway.

6. The system of claim 1, wherein the first product pathway includes at least one of:
a motorized carousel track;
a motorized linear track;
a chock-assisted linear track;
a gravity-assisted linear track; and
a gravity-assisted curved track.

7. The system of claim 1, wherein the first scanning zone of the single RFID antenna is included within a signaling range of the single RFID antenna with a greater area than the first scanning zone, wherein objects identified in the signaling range are not identified as being part of the first set of objects unless having also been identified within the first scanning zone.

8. A self-checkout kiosk, comprising:
a first RFID antenna, configured to project and receive signals relative to a first scanning zone;
a first motor, configured to move objects along a first product pathway relative to the first RFID antenna from a first position in the first scanning zone to a second position in the first scanning zone;
a second RFID antenna, configured to project and receive signals relative to a second scanning zone;
a second motor, configured to move the objects along a second product pathway relative to the second RFID antenna from a third position in the second scanning zone to a fourth position in the second scanning zone;
wherein the first product pathway is a linear track driven by the first motor; and
wherein the second product pathway is a carousel track driven by the second motor.

9. The kiosk of claim 8, wherein the first motor is configured to move the objects at a known speed.

10. The kiosk of claim 8, further comprising a separator bar disposed in the first product pathway, configured to prevent a given object from completing a circular path around the carousel track.

11. The kiosk of claim 8, wherein the first product pathway includes a chocked track, wherein the first motor drives chocks within the chocked track.

12. The kiosk of claim 8, wherein the second product pathway is configured to deliver items placed thereon to the first product pathway when driven by the second motor.

13. The kiosk of claim 8, wherein the second product pathway is configured to receive items from the first product pathway when the first product pathway is driven by the first motor.

14. The kiosk of claim 8, wherein the first motor is activated in response to the first RFID antenna detecting the objects in the first scanning zone.

15. A method, comprising:
    transmitting, via a single RFID antenna in a self-checkout kiosk, a first energization signal;
    receiving, by the single RFID antenna at a first time, a first set of identifier signals in response to the first energization signal;
    transmitting, via the single RFID antenna, a second energization signal;
    receiving, by the single RFID antenna at a second time, a second set of identifier signals in response to the second energization signal;
    identifying objects associated with at least one of the first set of identifier signals and the second set of identifier signals and that moved relative to the single RFID antenna between the first time and the second time;
    responsive to determining at least some of the objects are detected in both the first and second set of identifier signals, determining whether the at least some of the objects have been added to a transaction at the self-checkout kiosk; and
    responsive to determining that the at least some of the objects have not been added, adding the at least some of the objects to the transaction.

16. The method of claim 15, further comprising:
    in response to identifying at the first time that that the objects are present at a first position in a scanning zone of the single RFID antenna, activating a motor to move the objects from the first position to a second position within the scanning zone at the second time.

17. The method of claim 15, further comprising:
    ignoring identifier signals associated with items outside of a scanning zone of the single RFID antenna.

18. The method of claim 15, further comprising:
    using a plurality of distance measurements, at the single RFID antenna, to identify stationary objects in the self-checkout kiosk that are not part of the transaction.

19. The method of claim 15, wherein the at least some of the objects are added to the transaction only if the at least some of the objects have not already been added.

20. The method of claim 15, further comprising:
    responsive to determining that a first object of the objects is detected in the first set of identifier signals but not in the second set of identifier signals, add the first object to the transaction only if the first object has not already been added; and
    responsive to determining that a second object of the objects is detected in the second set of identifier signals but not in the first set of identifier signals, add the second object to the transaction only if the second object has not already been added.

* * * * *

UNITED STATES PATENT AND TRADEMARK OFFICE
CERTIFICATE OF CORRECTION

PATENT NO. : 11,495,097 B2
APPLICATION NO. : 16/854597
DATED : November 8, 2022
INVENTOR(S) : David Steiner et al.

It is certified that error appears in the above-identified patent and that said Letters Patent is hereby corrected as shown below:

In the Specification

In Column 7, Line 63, delete "FIG." and insert -- FIGS. --.

In Column 10, Line 41, delete "like" and insert -- like. --.

In the Claims

In Column 16, Line 8, in Claim 16, delete "that that" and insert -- that --.

Signed and Sealed this
Twenty-seventh Day of June, 2023

Katherine Kelly Vidal
*Director of the United States Patent and Trademark Office*